(No Model.)
L. WALKER.
HARNESS.
No. 362,686. Patented May 10, 1887.
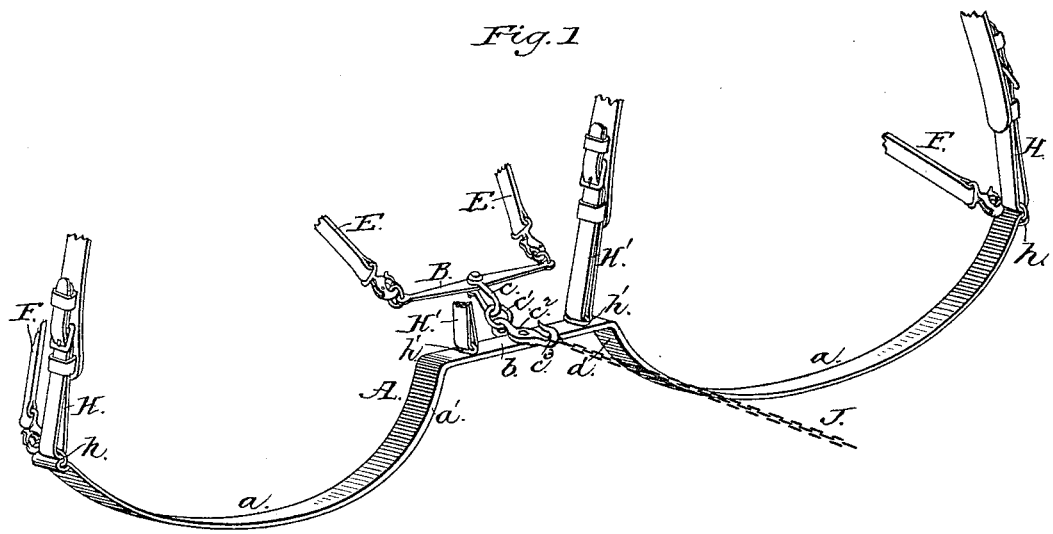
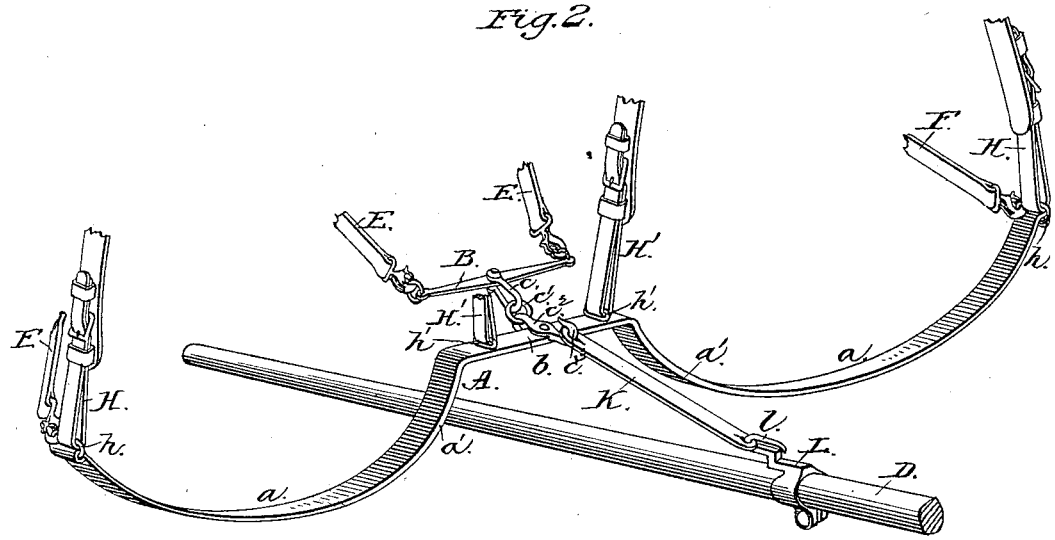
WITNESSES:
John A. Ellis
C. Sedgwick
INVENTOR:
L. Walker
BY Munn & Co.
ATTORNEYS.

UNITED STATES PATENT OFFICE.

LEVI WALKER, OF DELHI, ONTARIO, CANADA.

HARNESS.

SPECIFICATION forming part of Letters Patent No. 362,686, dated May 10, 1887.

Application filed September 3, 1885. Serial No. 176,108. (No model.) Patented in Canada August 6, 1885, No. 22,211.

*To all whom it may concern:*

Be it known that I, LEVI WALKER, a subject of the Queen of Great Britain, residing at the village of Delhi, in the county of Norfolk and Province of Ontario, Dominion of Canada, have invented a new and useful Improvement in Harness, (for which I have obtained a patent in the Dominion of Canada, No. 22,211, bearing date August 6, 1885,) of which the following is a specification.

My invention relates to certain improvements in that class of double harness wherein the draft-evener is suspended from ordinary back-pads and carried beneath the bodies of the horses; and my invention consists, principally, in connecting to the center of the main evener a short evener adapted to be connected at its ends by short traces to the inner hame of each horse.

The invention also consists of the combination, with the main evener, of a short draft-tug, combined with a clip, to which it is connected, secured to the tongue of the vehicle.

The invention finally consists of the construction, arrangement, and combination of parts, all as hereinafter described.

Reference is to be had to the accompanying drawings, forming a part of this specification, in which similar letters of reference indicate corresponding parts in both the figures.

Figure 1 is a perspective view of my improvement, showing one portion of the back-pad straps and traces; and Fig. 2 is a similar view showing the main evener attached to a vehicle-tongue.

A represents the main evener, made, by preference, of steel and formed with the side bows, $a\ a$, to fit beneath the bodies of the horses, so as not to interfere with their freedom of action. In its center said main evener is formed with the flat and somewhat elevated portion $b$, to form a space beneath it for the tongue D, which, in case of any material side swinging of the tongue, will strike the downwardly-curved surfaces $a'\ a'$ of the evener, and thus prevent the tongue from striking the horses.

To the center of the main evener A is connected the short evener B. This is by preference connected to the main evener by the clevis $c$, ring $c'$, and hooked clevis $c^2$, secured rigidly to the main evener by a rivet or otherwise. The ends of the short evener are adapted to be attached by the short inner traces, E E, to the inner hames of the harness on each horse. The outer ends of the main evener A are adapted to be connected to the outer hames of each harness by the traces F F, and the main evener is attached to the back-pads of the harness by the outer side straps, H H, and inner side straps, H' H', the main evener being provided with the four loops $h\ h'$ for that purpose. To the hook $c^3$ of the clevis $c^2$, in the form shown in Fig. 1, is connected the trace J, adapted to be attached to the load, while in Fig. 2 the trace K is attached to the hook, its opposite end being connected to the clip L, secured to the tongue D, the said clip being formed with the hook $l$ to receive said trace, as shown.

Having thus fully described my invention, I claim as new and desire to secure by Letters Patent—

1. The main evener A, constructed to be suspended from the backs of the horses and to pass beneath their bodies, in combination with the short evener B, connected to the center of the main evener, substantially as and for the purposes set forth.

2. The main evener A, constructed to pass beneath the bodies of the horses, in combination with the short trace K and clip L, attached to the tongue, the said trace being adapted to be connected to the clip and to the center of the main evener, substantially as described.

3. The main evener A, formed with the side bows, $a\ a$, and a central elevated portion, $b$, in combination with the clip L, attached to the tongue, and the short trace K, attached to the clip and to the center of the main evener, substantially as described.

LEVI WALKER.

Witnesses:
JAMES F. WILSON,
R. OSBORNE.